March 22, 1966　　　F. A. GICCA　　　3,242,494
POSITION DETERMINATION SYSTEM
Filed Jan. 25, 1962　　　　　　　　　　　　2 Sheets-Sheet 1

INVENTOR
FRANCIS A. GICCA

BY Herbert W. Arnold
ATTORNEY

March 22, 1966     F. A. GICCA     3,242,494
POSITION DETERMINATION SYSTEM
Filed Jan. 25, 1962     2 Sheets-Sheet 2

INVENTOR
FRANCIS A. GICCA
BY Herbert W. Arnold
ATTORNEY

United States Patent Office 3,242,494
Patented Mar. 22, 1966

3,242,494
POSITION DETERMINATION SYSTEM
Francis A. Gicca, Bedford, Mass., assignor to Raytheon Company, Lexington, Mass., a corporation of Delaware
Filed Jan. 25, 1962, Ser. No. 168,767
6 Claims. (Cl. 343—112)

The present invention relates to systems of three-dimensional position finding, or distance determination, and, more particularly, to a system which makes a plurality of measurements in both time and space at a pre-surveyed reference site comprising an array of at least four spaced receiving stations for the accurate navigation of a vehicle and the navigation or surveying of an unknown position. In the field of long-range navigation, it is imperative that satellites, ships at sea, or aircraft be able to determine their precise locations. In the field of surveying of remote locations, it is important that accurate surveying be accomplished in the absence of reference landmarks.

It has been previously proposed to develop a three-dimensional position system by utilizing a simple radio system for determining position and velocity. The simple radio system is a synchronized clock system which combines three transmitters synchronized by a common ground clock with a clock that is in synchronism with the common ground clock at each of the unknown positions to be located. Comparison of the phase of the signals transmitted from each of the transmitters with the unknown position synchronized reference clock enables the unknown position to be determined in three dimensions. Since the best clocks available today are stable to one part in $10^{11}$, a system requiring synchronized clocks will have an altitude error of at least 35 feet after one hour of operation. Inasmuch as altitude or the Z coordinate in a three-dimensional system is most critical, the use of a synchronized clock system over an extended period of time is believed to be impractical.

It has also been previously proposed that a system comprising four ground synchronized transmitters be utilized at a reference location in combination with a non-synchronized receiver-computer combination at the unknown position. The difference between the phase of the signal transmitted by the additional ground synchronized transmitter which acts as a reference, and the phase of the signals transmitted from the three other ground synchronized transmitters provides sufficient information to locate the unknown position in three dimensions. However, with this system it has been found that the vertical distance above or below the elevation of the reference ground is the distance with the greatest error, and it is the vertical distance which must be most accurate for many applications.

Another system which makes it possible to fix the position of an object in space utilizes both the satellite orbital information repeated by the satellite and a measurement of the rate of change of the frequencies (Doppler shift) transmitted from the satellite to determine the object's unknown position. Inasmuch as measurements of signal frequency shift (Doppler shift) are inherently less accurate than measurements of signal phase shift, a Doppler-based system will be unable to provide the accuracy of position determination which can be obtained by utilization of the system described herein.

Therefore, it is an object of the present invention to provide a new and improved system for determining the position of an object in space with a high degree of accuracy.

It is a further object of the invention to provide a system to determine the position of a means with respect to another means by making a plurality of relative phase measurements in both time and space.

It is a supplementary objective of the invention to provide a system to determine the motion characteristics, such as displacement, velocity, acceleration, etc. of a moving object with respect to a second object.

It is an additional object of the invention to provide a system to determine the motion characteristics of an unknown position by making both a plurality of measurements in both time and space and by determining the position of a means with respect to a predetermined plurality of means.

It is a further object of the invention to provide a system which determines the position of a vehicle by making at four or more locations, simultaneous measurements in both time and space.

It is an additional object of the invention to provide a system capable of allowing an unknown position to be determined from a vehicle position and four or more simultaneous time-independent phase measurements of a signal received from a vehicle.

It is a further object of the invention to provide a system capable of surveying unknown locations thousands of miles away from a pre-surveyed ground reference site with an accuracy which is equivalent to that obtained by using the most sophisticated techniques over relatively short distances.

In accordance with this invention, a system for determining the position of an object in three dimensions comprises a presurveyed ground reference site consisting of an array of at least four spaced receiving stations, each of the receiving stations containing a reference clock. The system includes a timed reading device to initiate simultaneous relative phase measurments in both time and space at each of the spaced receiving stations. There is provided a vehicle having a source of frequency carrier waves, stable oscillator means to generate modulation to vary a characteristic of the carrier waves, antenna means to transmit said frequency carrier waves, and repeater means to retransmit information relayed from the ground reference site. The system includes means to compute the orbital position of the vehicle and means to transmit the position of the vehicle to the vehicle repeater or elsewhere. Furthermore, the system includes at the unknown position means to receive the course information repeated by the vehicle, means to receive the vehicle generated frequency waves, means to make measurements in both time and space of the received vehicle generated frequency waves, and means for utilizing the above-received signals to compute the position of the unknown location.

For a better understanding of the present invention, together with other and further objects thereof, reference is had to the following description taken in connection with the accompanying drawings, and its scope will be pointed out in the appended claims.

Other objects and advantages will become apparent from the following description taken in connection with the accompanying drawing, wherein.

Figure 1:
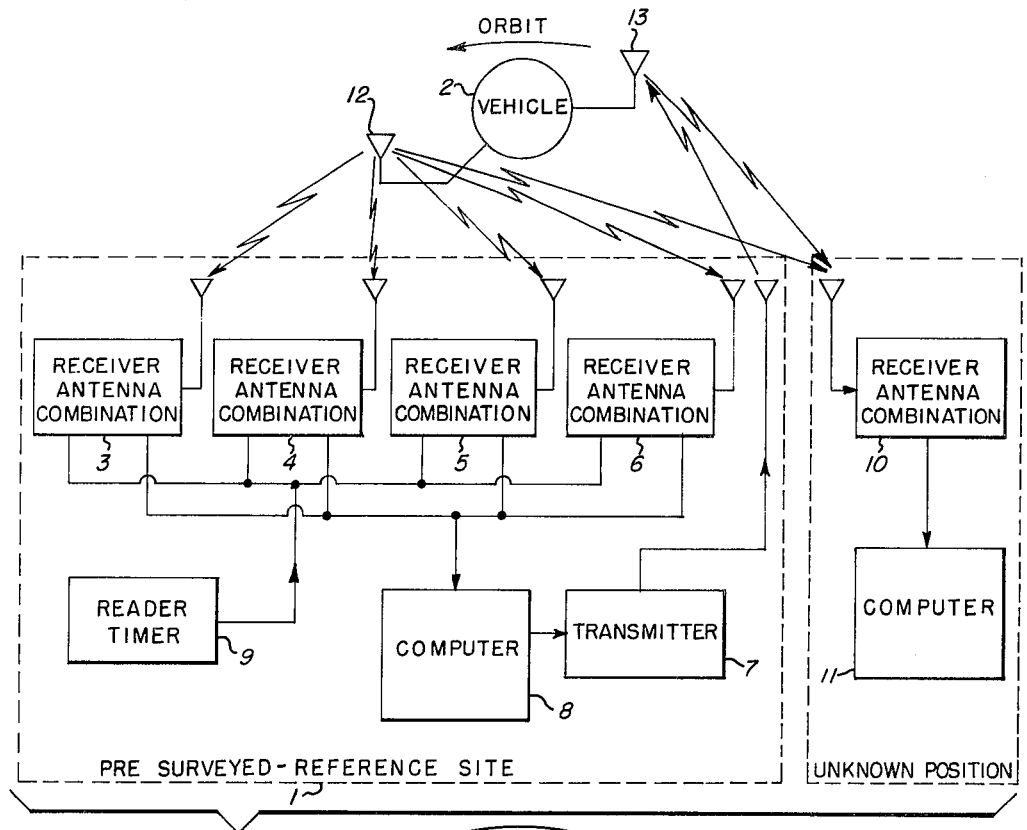
FIG. 1 illustrates the general arrangement of a system suitable for a three-dimensional position-finding system embodying the invention.

Referring particularly to FIG. 1, there is shown a pre-surveyed reference site 1 of known coordinates, which consists of four single sideband phase comparator-receiver antenna combinations 3, 4, 5, and 6 suitable for receiving signals for determining the position of an object in space. Each antenna-receiver combination has a predetermined spaced relationship with each other within said reference complex. There is a reader-timer 9 for facilitating the simulataneous relative phase measurements in both time and space at receiver-antenna combinations 3, 4, 5, and 6. Computer 8 is programmed to calculate the position of an object in space, such as a satellite. Included in close proximity to the computer 8 is a continuous wave transmitter 7 for transmitting the computer-calculated position of the object in space. Co-operating with said reference site there is a vehicle 2 with an antenna 12 for transmitting signals to the site, and a repeater antenna 13 for retransmitting the position of vehicle 2 received from transmitter 7 back to earth. At an unknown position, there is a receiver 10 adapted to receive signals transmitted by the satellite antennas 12 and 13 and make relative phase measurements a plurality of different times from signals transmitted by the satellite antenna 12, and a computer 11 programmed to calculate from the measurements the coordinates and/or velocity of the unknown position.

Figure 2:
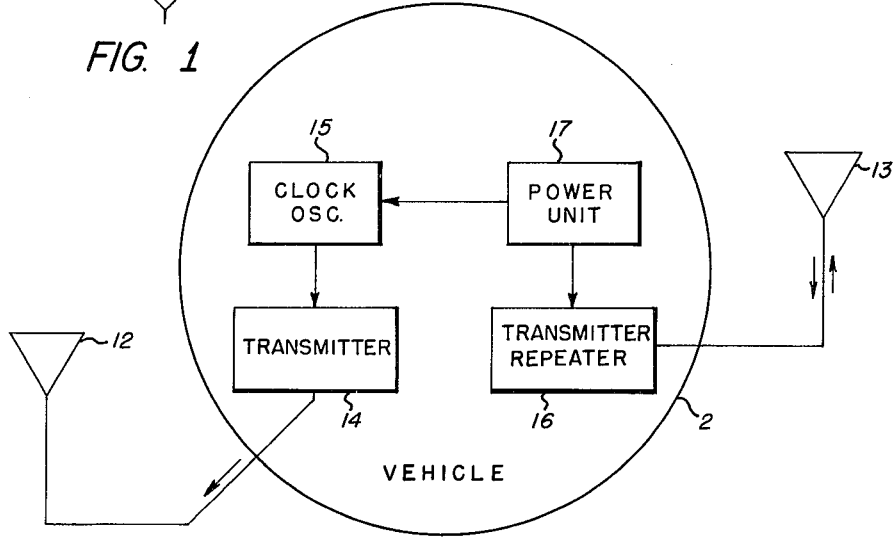
FIG. 2 is a block diagram of the combination of devices representing the vehicle.

FIG. 2 is a block diagram of the vehicle portion (2) of the system. Included within said satellite is a power unit 17 for supplying the necessary power to the electronic components, a stable clock oscillator 15 which is used to generate single-sideband modulations so as to limit the required transmission bandwidth and transmitter 14 which transmits the single-sideband modulations through antenna 12 to the ground so that the vehicle position can be determined at the pre-surveyed reference site. There is also included a repeater transmitter 16 which retransmits through repeater antenna 13 the signals received from transmitter 7 of FIG. 1.

Figure 3:
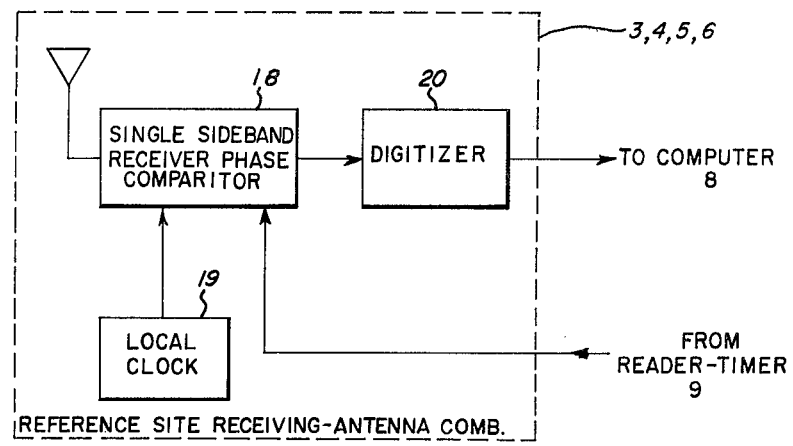
FIG. 3 is a block diagram of one of the receiver-antenna combinations at the reference site.

FIG. 3 is a block diagram of one of the receiving antenna combinations at the reference site. Included within said receiver-antenna combinations is a single sideband receiver phase comparator 18, a local clock 19 to supply a reference signal to the phase comparator 18 so that a phase comparison may be made between the reference signal and the signal transmitted by vehicle transmitter 14 and antenna 12, and a digitizing device 20 for converting the phase comparison into a digital format so that the information can be utilized by computer 8 for making computation of the vehicle's 2 orbit.

Figure 4:
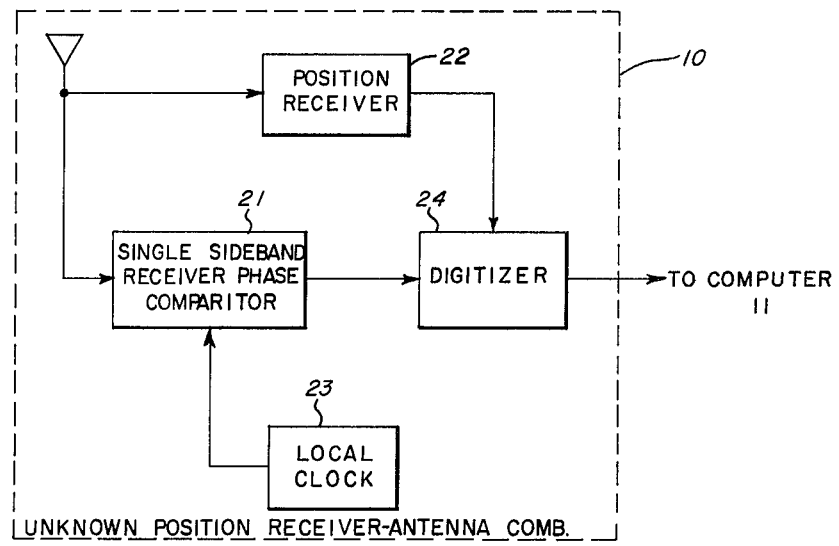
FIG. 4 is a block diagram at the unknown position receiver-antenna combination.

FIG. 4 is a block diagram of the unknown position receiver-antenna combination 10. Included within said receiver-antenna combination is a receiver phase comparator 21 for measuring phase differences between the single sideband signal sent from vehicle 2 of FIGS. 1 and 2 and local clock 23 of the receiver-antenna combination. There is also a position receiver 22 which receives the continuous wave position information sent from transmitter 7 of FIG. 1 and repeater antenna 13 of vehicle 2 of FIGS. 1 and 2. Connected to both the single sideband receiver phase comparator and the position receiver there is a digitizer to convert the phase measurements and the position information into a digital format suitable for utilization by computer 11 of FIG. 1.

Considering now the operation of the system described above and referring to FIG. 2, the clock 15 provides a continuous signal to modulate transmitter 14; transmitter 14, as modulated by clock 15 produces single sideband modulations which are trannsmitted by antenna 12. Referring now to FIGS. 1 and 3, receiver-antenna combinations 3, 4, 5, and 6 are given the command to read from reader-timer 9, the command pulse causes the single sideband-receiver phase comparator 18 to make a phase measurement, which is a comparison between the signal from local clock 19 (operating at the same frequency as the vehicle signal) and the single-sideband signal received from vehicle 2. The phase comparison information is then converted by digitizer 20 into a digital format suitable for computer 8's usage and forwarded to computer 8 where it is stored.

The command read pulse is initiated by reader timer 9 a total of four times so that the minimum required number of relative phase measurements can be made so as to be able to determine the vehicle position with respect to the reference site. During the measuring cycle, the phase measurements in both time and space are being stored in the computer memory after being converted into the computer format. At the completion of the read cycle, computer 8 has received and stored a total of sixteen measurements. The stored program in computer 8 then initiates the computer's calculation cycle to determine the vehicle's position. The satellite position is determined as follows:

$$R_{rs} = \sqrt{(X_r - X_s)^2 + (Y_r - Y_s)^2 + (Z_r - Z_s)^2} + \Delta\phi_{rs}$$

is measured at each of the reference receiving-antenna locations
where:

$R_{rs}$ = measured phase difference
$r$ = subscript denoting reference
$s$ = subscript denoting vehicle
$\Delta\phi_{rs}$ = phase bias difference The unknowns are $X_s$, $Y_s$, $Z_s$, and $\Delta\phi_{rs}$
The knowns are $X_r$, $Y_r$, $Z_r$, and $R_{rs}$ The sixteen-place independent phase measurements yield sixteen independent simultaneous equations of the form noted above. There are a total of sixteen unknowns which are then solved by computer 8 using a stored program based on the solution of simultaneous equations.

The position information is then forwarded by computer 8 in digital form to transmitter 7, which converts it to a continuous waveform and then transmits the information to the vehicle.

The vehicle then repeats the information received from transmitter 7 by the use of repeater 16 and repeater antenna 13.

At the unknown position, FIGS. 1 and 4, the single-sideband receiver phase comparator 21 detects the vehicles single-sideband transmissions from vehicle antenna 12 and performs four phase measurements against its own local clock 23. The four phase measurements are digitized by digitizer 24 as recorded and forwarded to computer 11 of FIG. 1 for storage.

At the unknown position antenna receiver combination, the position receiver 22 detects the repeated signals from vehicle antenna 13 and forwards this position information through computer format digitizer 24 to computer 11 of FIG. 1 for storage. At the end of four independent phase measurements taken at different times the computer has sufficient information to determine the unknown position.

The unknown's position is determined as follows:

The unknown receiving station measures a phase difference of the four phase measurements against its own local clock 23. The four phase measurements are digitized by digitizer 24 as recorded and forwarded to computer 11 of FIG. 1 for storage. At the unknown position antenna-receiver combination, there is also a position receiver 22 which detects the repeated signals from satellite antenna 13 and forwards this position information through computer format digitizer 24 to computer 11 of FIG. 1 for storage. At the end of four independent relative phase measurements in both time and space, the computer has stored a total of four phase measurements and the related information of the vehicle's position during each of these phase measurements. The stored program in computer 11 then initiates the computer's calculation cycle so as to determine the unknown's position utilizing both the phase measurement information and its related position information.

The unknown's position is determined as follows:

The unknown receiving station measures a phase difference of the form $$R_{us} = \sqrt{(X_u - X_s)^2 + (Y_u - Y_s)^2 + (Z_u - Z_s)^2} + \Delta\phi_{us}$$

where:

$R_{us}$ = measured phase difference
$u$ = subscript denoting unknown station
$s$ = subscript denoting vehicle
$\Delta\phi_{us}$ = phase bias difference
The unknowns are $X_u, Y_u, Z_u$, and $\Delta\phi_s$
The knowns are $X_s, Y_s, Z_s$, and $R_{us}$ Since the known quantities remain known at each of the independent relative phase measurements in both time and space and the unknowns remain fixed, there is a total of four independent simultaneous equations which the computer 11 then solves to determine the unknown position utilizing a stored simultaneous solution.

This completes the description of the preferred embodiment of the invention. However, many modifications of the invention will be apparent to persons skilled in the art.

For example: an embodiment of the present invention whereby it is still possible even if the satellite has a fixed frequency offset from the reference ground local clocks to make a determination of vehicle position with four reference receiving antenna combinations and eight time points. The position determination could then be made as follows:

$$R_{rs} = \sqrt{(X_r - X_s)^2 + (Y_r - Y_s)^2 + (Z_r - Z_s)^2} + \Delta\phi_{rs} + \Delta\dot{\phi}_{rs}$$

where:

$\Delta\dot{\phi}_{rs}$ = phase rate bias difference

Unknowns are $X_s, Y_s, Z_s, \Delta\phi_{rs}$, and $\Delta\dot{\phi}_{rs}$
Knowns are $X_r, Y_r, Z_r, R_{rs}$ The total of eight time points provide thirty-two independent simultaneous equations with thirty-two unknowns, which then can be solved by computer 3's stored program.

Other possible embodiments of the invention might include numerous combinations of transmitters and receivers on the ground and receivers and transmitters in the vehicle. Although the preferred embodiment shows the use of single sideband signals in the present invention to obtain a better signal-to-noise ratio, it is possible to use signals other than single sideband in another embodiment of the invention.

It would also be possible to use the proposed system as a worldwide highly accurate vehicle navigation system without the necessity of obtaining optical sightings on the vehicle, since the vehicle repeater broadcasts its position. Accordingly, it is desired that this invention not be limited except as defined by the appended claims.

What is claimed is:

1. A position finding system comprising:
a vehicle including modulation means for producing modulated signals and transmitter means connected to said modulation means for transmitting said modulated signals; and,
vehicle position determining means located at a predetermined reference site away from said vehicle including a plurality of independent phase measurement means each located at different predetermined positions and comprising receiving means for receiving said vehicle modulated signals, oscillator means for producing reference signals, and phase comparison means connected to said receiving means and to said oscillator means for measuring the phase differential between said modulated signals and said reference signals and producing phase differential signals a plurality of different times, and computing means connected to said plurality of independent phase measurement means for receiving from each a plurality of said phase differential signals and in response thereto calculating the position of said vehicle.

2. A position finding system comprising:
a moving vehicle including modulation means for producing modulated signals and transmitter means connected to said modulation means for transmitting said modulated signals; and,
vehicle position determining means located at a predetermined stationary reference site away from said vehicle including command means for producing command signals, a plurality of independent phase measurement means connected to said command means each being simultaneously responsive to said command signals and comprising receiving means for receiving said vehicle modulated signals, oscillator means for producing reference signals, and phase comparison means connected to said receiving means and said oscillator means for measuring the phase differential between said modulated signals and said reference signals and producing phase differential signals a plurality of different times, digitizer means connected to said plurality of independent phase measurement means for changing said phase differential signals to digital words, and digital computer means connected to said digitizer means and being responsive to all of said digital words for calculating the position of said vehicle.

3. A position finding system comprising:
a vehicle including modulation means for producing modulated signals, transmitter repeater means, and transmitter means connected to said modulation means for transmitting said modulated signals;
vehicle position determining means located at a predetermined reference site away from said vehicle including at least one phase measurement means comprising receiving means for receiving said vehicle modulated signals, oscillator means for producing reference signals, and phase comparison means connected to said receiving means and to said oscillator means for measuring the relative phase between said modulated signals and said reference signals and producing phase differential signals, computing means connected to said phase measurement means for receiving at least one of said phase differential signals, in response thereto calculating the position of said vehicle, and producing vehicle position signals, and transmitting means connected to said computing means for transmitting said vehicle position signals;
said vehicle transmitter repeater means being responsive to said transmitted vehicle position signals for retransmitting said vehicle position signals; and,
unknown position means for determining said unknown position including a receiving means for receiving said retransmitted vehicle position signals and said vehicle modulated signals, a phase measurement means connected to said receiving means comprising an oscillator means for producing reference signals, and phase comparison means connected to said receiving means and to said oscillator means for measuring the phase differential between said modulated signals and said reference signals and producing signals, and computing means connected to said phase measurement means and to said receiving means being responsive to said phase differential signals and said retransmitted vehicle position signals for calculating therefrom said unknown position.

4. A position finding system comprising:
a vehicle including modulation means for producing modulated signals, transmitted repeater means, and transmitter means connected to said modulation means for transmitting said modulated signals;
vehicle position determining means located at a predetermined reference site away from said vehicle including a plurality of independent phase measurement means each located at a different predetermined position and comprising receiving means for receiving said vehicle modulated signals, oscillator means for producing reference signals, and phase comparison means connected to said receiving means and to said oscillator means for measuring the phase differential between said modulated signals and said reference signals and producing phase differential signals a plurality of different times, computing means connected to said plurality of independent phase measurement means for receiving from each a plurality of said phase differential signals, in response thereto calculating the position of said vehicle, and producing vehicle position signals, and transmitting means connected to said computing means for transmitting said vehicle position signals;

said vehicle transmitter repeater means being responsive to said transmitted vehicle position signals for retransmitting said vehicle position signals; and, unknown position means for determining said unknown position including a receiving means for receiving said retransmitted vehicle position signals and said vehicle modulated signals, a phase measurement means connected to said receiving means comprising an oscillator means for producing reference signals, and phase comparison means connected to said receiving means and to said oscillator means for measuring the phase differential between said modulated signals and said reference signals and producing phase differential signals a plurality of different times, and computing means connected to said phase measurement means and to said receiving means being responsive to a plurality of said phase differential signals and said retransmitted vehicle position signals for calculating said unknown position.

5. A position finding system comprising:

a vehicle including modulation means for producing modulated signals, transmitter repeater means, and transmitter means connected to said modulation means for transmitting said modulated signals;

vehicle position determining means located at a predetermined reference site away from said vehicle including a plurality of independent phase measurement means each located at a different predetermined position and comprising receiving means for receiving said vehicle modulated signals, oscillator means for producing reference signals, and phase comparison means connected to said receiving means and to said oscillator means for measuring the phase differential between said modulated signals and said reference signals and producing phase differential signals a plurality of different times, digitizer means connected to said plurality of independent phase measurement means for changing said phase differential signals to digital words, digital computer means connected to said digitizer means for receiving said digital words, in response thereto calculating the position of said vehicle, and producing vehicle position signals, and transmitting means connected to said computer means for transmitting said vehicle position signals;

said vehicle transmitter repeater means being responsive to said transmitted vehicle position signals for retransmitting said vehicle position signals; and, unknown position means for determining said unknown position including a receiving means for receiving said retransmitted vehicle position signals and said vehicle modulated signals, a phase measurement means connected to said receiving means comprising an oscillator means for producing reference signals, and phase comparison means connected to said receiving means and said oscillator means for measuring the phase differential between said modulated signals and said reference signals and producing phase differential signals a plurality of different times, digitizer means connected to said receiving means and to said phase measurement for producing signal words representing said vehicle position signals and said phase differential signals, and, digital computer means connected to said digitizer means being responsive to said digital words for calculating said unknown position.

6. A position finding system comprising:

a moving vehicle including modulation means for producing modulated signals, transmitter repeater means, and transmitter means connected to said modulation means for transmitting said modulated signals;

vehicle position determining means located at a predetermined stationary reference site away from said vehicle including command means for producing command signals, at least four independent phase measurement means connected to said command means each simultaneously responsive to said command signals, located at a different predetermined position, and comprising receiving means for receiving said vehicle modulated signals, oscillator means for producing reference signals, and phase comparison means connected to said receiving means and to said oscillator means for measuring the phase differential between said modulated signals and said reference signals and producing phase differential signals at least four different times, digitizer means connected to said at least four independent phase measurement means for changing said phase differential signals to digital words, digital computer means connected to said digitizer means for receiving at least sixteen of said digital words, in response thereto calculating the position of said vehicle, and producing vehicle position signals, and transmitting means connected to said computer means for transmitting said vehicle position signals;

said vehicle transmitter repeater means being responsive to said transmitted vehicle position signals for retransmitting said vehicle position signals; and, unknown position means for determining said unknown position including a receiving means for receiving said retransmitted vehicle position signals and said vehicle modulated signals, a phase measurement means connected to said receiving means comprising an oscillator means for producing reference signals, and phase comparison means connected to said receiving means and said oscillator means for measuring the phase differential between said modulated signals and said reference signals and producing phase differential signals at least four different times, digitizer means connected to said receiving means and to said phase measurement means for producing digital words representing said vehicle position signals and said at least four phase differential signals, and digital computer means connected to said digitizer means being responsive to all of said digital words for calculating said unknown position.

References Cited by the Examiner

UNITED STATES PATENTS

| | | |
|---|---|---|
| 2,968,034 | 1/1961 | Cafarelli. |
| 3,060,425 | 10/1962 | Cutler _____ 343—112 |
| 3,125,756 | 3/1964 | Kaufman et al. |
| 3,126,545 | 3/1964 | Smith. |

OTHER REFERENCES

Proceedings of the I.R.E.: April, 1960 pp. 507–516, vol. 48, No. 4.

I.R.E.: Transactions on Space Electronics and Telemetry, December, 1959, pp. 186–193, vol. SET–5, November 4.

Transit: Space/Aeronautics, June 1960, pp. 154–157.

CHESTER L. JUSTUS, *Primary Examiner.*

R. E. BERGER, *Assistant Examiner.*